Figure 1:
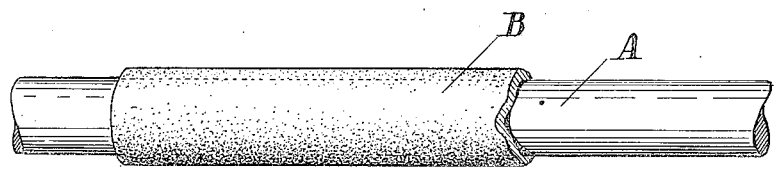

May 27, 1924.                                                                1,495,632
L. DE RAPHÉLIS-SOISSAN
PROCESS FOR THE ENAMELING OF METALS, WIRES, AND METAL STRUCTURES
Filed June 24, 1922

Inventor
Louis de Raphélis-Soissan.
per R. S. Waters
Attorney.

Patented May 27, 1924.

1,495,632

UNITED STATES PATENT OFFICE.

LOUIS DE RAPHÉLIS-SOISSAN, OF MARSEILLE, FRANCE.

PROCESS FOR THE ENAMELING OF METALS, WIRES, AND METAL STRUCTURES.

Application filed June 24, 1922. Serial No. 570,725.

*To all whom it may concern:*

Be it known that I, LOUIS DE RAPHÉLIS-SOISSAN, a citizen of the Republic of France, residing at Marseille, France, have invented certain new and useful Improvements in Processes for the Enameling of Metals, Wires, and Metal Structures, of which the following is a specification.

This invention relates to an enameling process and more particularly to a process for the enameling of electric wires; the object of the invention being to permit of the final shaping of the wire before the application of the heat. According to the present invention the wire is coated with a ground layer of a porous substance which will not melt at the melting temperature of enamel, nor carbonize at such temperature, nor react chemically with the underlaying metal; for example, asbestos in any suitable form may be employed.

On the said ground layer, which may consist of a wound or woven filament, or of an envelope, the fusible enamel in powder form is applied either directly or in combination with a glue solution, said powder in melting giving the finished enamel.

Due to the previous application of the ground layer of porous substance which does not melt or carbonize at the melting temperature of the enamel, it is possible to obtain after the application of the heat a better and more complete adhesion of the enamel coating which in melting closes the interstices of the porous substance used as the ground layer; and this action results in a greater tenacity as well as greater elasticity than could be obtained with the usual direct enameling processes not utilizing a ground layer.

In the case, for example, of a wire structure such as a relay or coil in which the ground layer is of asbestos in threads, the naked wire is first covered with one or more strata of asbestos thread windings. The asbestos thread may be replaced by a coating of asbestos in powder, pasted onto the wire. Upon the asbestos layer a coating of powdered enamel is incorporated by means of a known agglutinating substance, for instance liquid glue and the powdered enamel in melting effects the enameling of the work. Otherwise the enamel powder may be incorporated with the asbestos thread before its application on the naked wire. When the coated structure has dried, the asbestos effectively retains the enamel powder, thus permitting of the final shaping of the structure before the application to heat, even in such cases in which the structure is surrounded by an envelope.

As soon as the structure has received its final form, it is exposed to a temperature high enough to ensure the proper melting of the enamel on the whole surface. The structure is thus coated with a closely adhering stratum of enamel, insulating electrically the metal parts of the structure, increasing rigidity and protecting the structure from the action of air.

For the application of the necessary heat to melt the enamel the heat may be very simply produced by causing an electric current of sufficient intensity to flow through the wire thus raising its temperature to the point necessary to melt enamel.

The enameling substance, which in melting gives the finished product is chosen according to the metal employed, and so that the melting temperature of the powder is below the melting temperature of the metal wire, and that the coefficients of expansion of the different ingredients do not differ too greatly; also taking care that when heating no chemical combination shall take place between the metal structure and the enameling powder.

Figure 2:
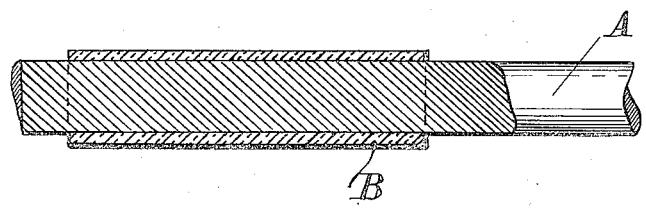
Figure 3:
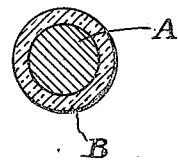

On the accompanying drawing, given as an example of an execution of the invention:

Figs. 1, 2 and 3 show respectively in elevation, in longitudinal section and in transversal section a wire covered with a layer or tissue of flexible stuff containing the enamel powder.

In the drawing: A is the naked wire and B is the layer or tissue of flexible stuff containing the powdered enamel.

What I claim is:—

In a process for the manufacture of insulated enamelled electric wires; in which the wire is to be insulated by enameling, first coating the wire with a ground stratum of a flexible porous substance, subsequently applying a stratum of powdered enamel, setting the wire in the proper shape, and finally heating to the degree necessary to melt the powdered enamel constituting the insulating coating resting upon the base or ground stratum.

In testimony whereof I affix my signature in presence of two witnesses.

LOUIS DE RAPHÉLIS-SOISSAN.

Witnesses:
EUGENE DUCAASSON,
ALEXANDER S. CRUGER.